US012665236B2

(12) United States Patent
Kim et al.

(10) Patent No.: US 12,665,236 B2
(45) Date of Patent: Jun. 23, 2026

(54) CARTRIDGE TYPE SECONDARY BATTERY MODULE, CARTRIDGE MODULE, AND BATTERY PACK INCLUDING SAME

(71) Applicant: SK ON CO., LTD., Seoul (KR)

(72) Inventors: Ji San Kim, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 637 days.

(21) Appl. No.: 18/299,062

(22) Filed: Apr. 12, 2023

(65) Prior Publication Data

US 2024/0170762 A1      May 23, 2024

(30) Foreign Application Priority Data

Nov. 21, 2022    (KR) ........................ 10-2022-0156785

(51) Int. Cl.
*H01M 10/6555* (2014.01)
*H01M 10/613* (2014.01)
*H01M 10/625* (2014.01)
*H01M 50/204* (2021.01)
*H01M 50/242* (2021.01)
*H01M 50/262* (2021.01)

(52) U.S. Cl.
CPC ..... *H01M 10/6555* (2015.04); *H01M 10/613* (2015.04); *H01M 10/625* (2015.04); *H01M 50/204* (2021.01); *H01M 50/242* (2021.01); *H01M 50/262* (2021.01); *H01M 2220/20* (2013.01)

(58) Field of Classification Search
CPC ............. H01M 10/655; H01M 10/658; H01M 10/613; H01M 10/625; H01M 10/647; H01M 10/653; H01M 50/262; H01M 50/209; H01M 50/242; H01M 50/211; H01M 50/204
See application file for complete search history.

(56) References Cited

U.S. PATENT DOCUMENTS

2022/0069377 A1* 3/2022 Rhee ................... H01M 10/658

FOREIGN PATENT DOCUMENTS

| KR | 10-2010-0122057 A | 11/2010 | | |
|---|---|---|---|---|
| KR | 10-2016-0053762 A | 5/2016 | | |
| KR | 10-2019-0044872 A | 5/2019 | | |
| KR | 10-2021-0011642 A | 2/2021 | | |
| KR | 20210056074 A * | 5/2021 | ......... | H01M 50/502 |
| KR | 10-2022-0029941 A | 3/2022 | | |
| KR | 10-2022-0036171 A | 3/2022 | | |
| WO | WO-2017052051 A1 * | 3/2017 | ......... | H01M 50/209 |

* cited by examiner

*Primary Examiner* — Karie O'Neill Apicella
(74) *Attorney, Agent, or Firm* — IP & T GROUP LLP

(57) ABSTRACT

A cartridge type secondary battery module includes a plurality of secondary battery cells; and a cartridge comprising an accommodating portion in which the plurality of secondary battery cells are accommodated, a cooling plate in contact with at least one of the secondary battery cells, and a blocking member in contact with at least one of the secondary battery cells, wherein the accommodating portion comprises at least one open surface.

13 Claims, 6 Drawing Sheets

CARTRIDGE TYPE SECONDARY BATTERY MODULE, CARTRIDGE MODULE, AND BATTERY PACK INCLUDING SAME

CROSS-REFERENCE TO RELATED APPLICATION

The present application claims priority under 35 U.S.C. § 119(a) to Korean patent application number 10-2022-0156785 filed on Nov. 21, 2022, the entire disclosure of which is incorporated by reference herein.

BACKGROUND

1. Technical Field

Embodiments of the present disclosure relate to a cartridge type secondary battery module, a cartridge module, and a battery pack including the same.

2. Related Art

With the development of electronics, communications, and space industries, the demand for lithium secondary batteries as an energy power source is rapidly increasing. In particular, the electric vehicle market is growing by leaps and bounds, and research and development on lithium secondary batteries are actively carried out at home and abroad.

The lithium secondary battery typically includes among other elements a cathode, an anode, and a separator interposed therebetween, and active materials that lithium ions may be inserted and extracted are provided in the cathode and the anode, respectively.

On the other hand, with an increase in the need for large-capacity structures as well as applicability as an energy storage source, the demand for a plurality of secondary batteries that are electrically connected in series and/or parallel and battery modules having module housings that accommodate such secondary batteries therein is rising.

However, in prior battery modules, when a sudden temperature rise occurs due to thermal propagation of battery cells, heat is propagated successively and rapidly to adjacent cells, increasing the chance of a fire in the adjacent cells.

SUMMARY

Embodiments provide a novel type of cartridge for a secondary battery module used as a power source for example in an eco-friendly vehicle such as an electric vehicle. The novel type of cartridge is designed in preparation for thermal propagation, and may be applied to a cartridge module and a battery pack including the same.

In accordance with one aspect of the present disclosure, there is provided a cartridge type secondary battery module including a plurality of secondary battery cells; and a cartridge comprising an accommodating portion in which the plurality of secondary battery cells are accommodated, a cooling plate in contact with at least one of the secondary battery cells, and a blocking member in contact with at least one of the secondary battery cells, wherein the accommodating portion comprises at least one open surface.

In accordance with another aspect of the present disclosure, there is provided a cartridge module including a plurality of secondary battery modules each comprising a plurality of secondary battery cells and a cartridge configured to accommodate the plurality of secondary battery cells, wherein the cartridge comprises: an accommodating portion in which the plurality of secondary battery cells are accommodated and which comprises at least one open surface; a cooling plate in contact with at least one of the secondary battery cells; and a blocking member in contact with at least one of the secondary battery cells.

In accordance with another aspect of the present disclosure, there is provided a battery pack including a pack case; and a plurality of cartridge modules embedded in the pack case, wherein each of the cartridge modules comprises a plurality of secondary battery modules each comprising a plurality of secondary battery cells and a cartridge configured to accommodate the plurality of secondary battery cells, and wherein the cartridge comprises: an accommodating portion in which the plurality of secondary battery cells are accommodated and which comprises at least one open surface; a cooling plate in contact with at least one of the secondary battery cells; and a blocking member in contact with at least one of the secondary battery cells.

In accordance with another aspect of the present disclosure, there is provided a cartridge module including a plurality of secondary battery modules each comprising a plurality of secondary battery cells and a cartridge configured to accommodate the plurality of secondary battery cells, wherein the cartridge comprises: an open end; a closed end; a cooling plate in contact with the plurality of secondary battery cells; and at least one shock absorption layer disposed between at least one of the secondary battery cells and a closed end wall of the cartridge, and configured to be elastically compressed by swelling of the secondary battery cell upon heating.

BRIEF DESCRIPTION OF THE DRAWINGS

Various embodiments will now be described more fully hereinafter with reference to the accompanying drawings; however, these embodiments shown in the drawings may be embodied in different forms, and the present disclosure should not be construed as limited to the embodiments set forth herein. Rather, these embodiments are provided so that this disclosure will convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram for illustrating a cartridge type secondary battery module in accordance with one embodiment of the present disclosure.

FIG. 7 is a cross-sectional view for illustrating a cartridge type secondary battery module in accordance with another embodiment of the present disclosure.

DETAILED DESCRIPTION

The specific structural or functional description disclosed herein is merely illustrative for the purpose of describing embodiments according to the present disclosure. The embodiments described in the present disclosure can be implemented in various forms, and the present disclosure should not be construed as limited to the embodiments set forth herein.

In accordance with one embodiment of the present disclosure, it is possible to provide a cartridge type secondary battery module including a plurality of secondary battery cells; and a cartridge including an accommodating portion in which the plurality of secondary battery cells are accommodated, a cooling plate coming in contact with at least one of the secondary battery cells, and a blocking member coming in contact with at least one of the secondary battery cells, wherein the accommodating portion may include at least one open surface.

Figure 1:
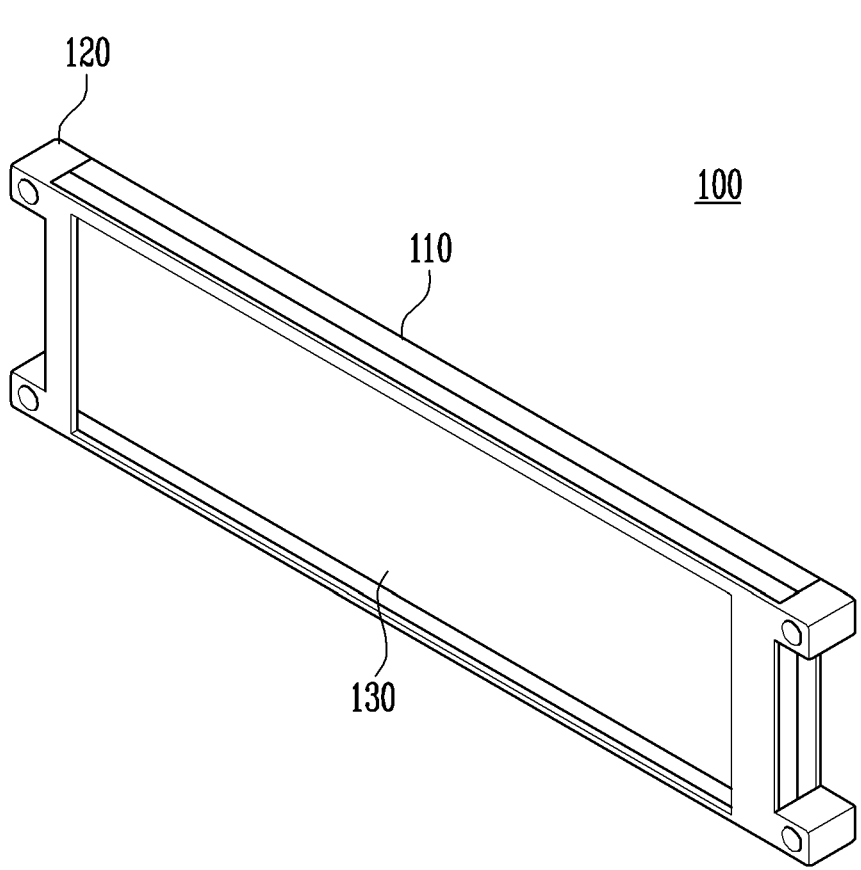
FIG. 1 is a diagram for illustrating a cartridge in a cartridge type secondary battery module in accordance with one embodiment of the present disclosure.

FIG. 1 is a diagram for illustrating a cartridge in a cartridge type secondary battery module in accordance with an embodiment of the present disclosure.

Referring to FIG. 1, a cartridge 100 may include a cooling plate 110, an outer frame 120, and a blocking member 130. In one embodiment of the present disclosure, the cartridge 100, the cooling plate 110, the outer frame 120, and the blocking member 130 are eco-friendly components which can be used for example in an electric vehicle that is driven using a secondary battery or electricity as a power source, or in a hybrid vehicle that is driven using an engine and a secondary battery. Moreover, the cartridge 100, the cooling plate 110, the outer frame 120, and the blocking member 130 reduce the chances of catastrophic destruction of such electric or hybrid vehicles from battery fires.

The cooling plate 110 may be in contact with at least one of the secondary battery cells accommodated inside the cartridge 100. In one embodiment, the cooling plate 110 may be in contact with one surface of the secondary battery cell accommodated inside the cartridge 100. An area of the cooling plate 110 may be provided to be greater than that of the secondary battery cell accommodated inside the cartridge 100. The cooling plate 110 may be formed of a material with a higher thermal conductivity than that of the secondary battery cell. In one embodiment, the cooling plate 110 may be formed of a metal. For example, the cooling plate 110 may be formed of aluminum.

The outer frame 120 may be formed along an outer circumference of the cooling plate 110. An accommodating portion in which the secondary battery cell is accommodated may be formed by the outer frame 120 and the cooling plate 110. In one embodiment, one surface of the accommodating portion may be opened. In one embodiment, one surface of the accommodating portion opposed to the cooling plate 110 may be opened. The outer frame 120 may further include a coupling portion, and the coupling portion may include a coupling hole through which the bolt is capable of passing in a direction in which the cartridge 100 is stacked. In FIG. 1, four coupling portions 120 are shown, but the present disclosure is not limited thereto, and an appropriate number of coupling portions 120 may be provided as necessary. In addition, in FIG. 1, it is shown that the coupling portion is connected to an edge of the outer frame, but the position of the coupling portion is not limited thereto, and the coupling portion may be positioned in a place such that a coupling hole in the coupling portion (through which a bolt is capable of passing) is accommodated. In addition, in FIG. 1, it is shown that the coupling portion is included with the outer frame 120, but is not limited thereto, and the coupling portion may be included in the cooling plate 110 or coupled to the cooling plate 110 and the outer frame 120 by a separate coupling as a component separated from the cooling plate 110 and the outer frame 120.

The blocking member 130 may be disposed in the accommodating portion formed by the outer frame 120 and the cooling plate 110. The blocking member 130 may be a member for blocking heat. In one embodiment, the blocking member 130 may come in contact with at least one of the secondary battery cells accommodated inside the cartridge 100. In one embodiment, the blocking member 130 may come in contact with one surface of the secondary battery cell accommodated inside the cartridge 100. Here, a first surface of the secondary battery cell in contact with the cooling plate 110 and a second surface of the secondary battery cell in contact with the blocking member 130 may be different from each other. For example, the secondary battery cell in contact with the cooling plate 110 and the secondary battery cell in contact with the blocking member 130 may be different from each other. Alternatively, the cooling plate 110 and the blocking member 130 may be in contact with the same secondary battery cell, but in contact with different surfaces of the secondary battery cell, respectively. In one embodiment, the blocking member 130 may be in a sheet shape, but the present disclosure is not limited thereto.

Figure 2:
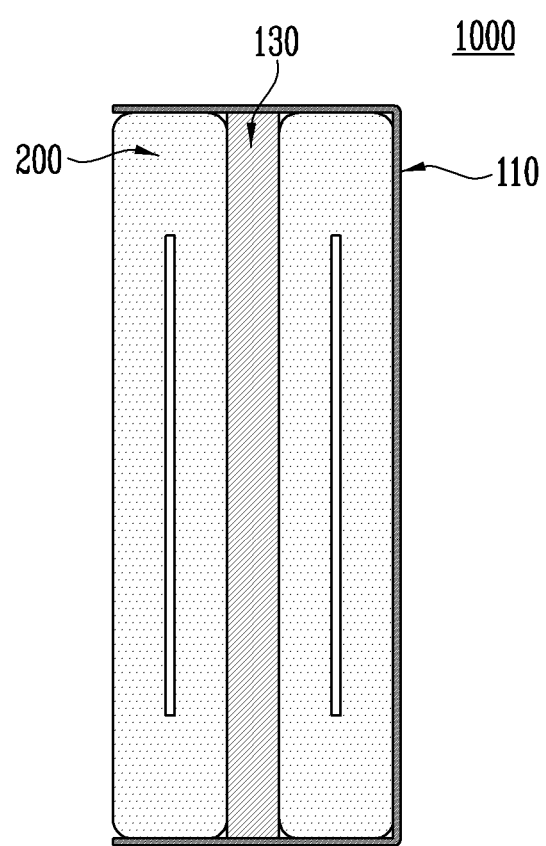
FIG. 2 is a cross-sectional view for illustrating a cartridge type secondary battery module in accordance with another embodiment of the present disclosure.

FIG. 2 is a cross-sectional view for illustrating the cartridge type secondary battery module in accordance with another embodiment of the present disclosure.

Referring to FIG. 2, in a cartridge type secondary battery module 1000, a plurality of secondary battery cells 200 may be accommodated in the accommodating portion that is formed by the cooling plate 110. In one embodiment, the cooling plate 110 may be in a shape of 'C' as shown in FIG. 2, and one accommodating portion may be formed by the shape of the cooling plate 110. In FIG. 2, it is shown that two secondary battery cells 200 are accommodated in one accommodating portion, but it is not limited thereto, and three or more secondary battery cells 200 may be accommodated in one accommodating portion. A first secondary battery cell 200 accommodated in the accommodating portion may be surrounded by the cooling plate 110 and the blocking member 130, therefore disposed at an interior position within the accommodating portion. A surface of another, a second secondary battery cell 200, accommodated in the accommodating portion may be disposed in a direction of an open surface of the accommodating portion, therefore the second secondary battery may be disposed at an exterior position within the accommodating portion.

The secondary battery cell 200 may include one or more electrode assemblies for a secondary battery. The electrode assembly for a secondary battery may include a plurality of anode plates, a plurality of cathode plates, and a separator.

The cathode plate and the anode plate may respectively include a current collector and an active material layer disposed on the current collector. For example, the cathode plate may include a cathode current collector and a cathode active material layer, and the anode plate may include an anode current collector and an anode active material layer.

The current collector may include a known conductive material that does not cause a chemical reaction in a lithium secondary battery. For example, the current collector may include one of stainless steel, nickel (Ni), aluminum (Al), titanium (Ti), copper (Cu), and alloys thereof, and may be provided in various forms such as a film, sheet, and foil.

The active material layer includes an active material. For example, the cathode active material layer may include a cathode active material, and the anode active material layer may include an anode active material.

The cathode active material may be a material that lithium (Li) ions may be inserted and extracted. The cathode active material may be lithium metal oxide. For example, the cathode active material may be one of lithium manganese-based oxides, lithium nickel-based oxides, lithium cobalt-based oxides, lithium nickel manganese-based oxides, lithium nickel cobalt manganese-based oxides, lithium nickel cobalt aluminum-based oxides, lithium iron phosphate-based compounds, lithium phosphate manganese-based compounds, lithium phosphate cobalt-based compounds, and lithium phosphate vanadium-based compounds, but the present disclosure is not necessarily limited to these specific examples.

The anode active material may be a material that lithium ions may be adsorbed and extracted. For example, the anode active material may be any of carbon-based materials such as crystalline carbon, amorphous carbon, carbon composites, or carbon fibers, lithium alloy, silicon (Si), and tin (Sn). In accordance with one embodiment, the anode active material may be natural graphite or artificial graphite, but the present disclosure is not limited to these specific examples.

The cathode plate and the anode plate may further include a binder and a conductive material, respectively.

The binder may be configured to mediate the bonding between the current collector and the active material layer, thereby improving mechanical stability. In accordance with one embodiment, the binder may be an organic binder or a water-based binder and used with a thickener such as carboxymethyl cellulose (CMC). In accordance with another embodiment, the organic binder may be any of vinylidene fluoride-hexafluoropropylene copolymer (PVDF-co-HFP), polyvinylidene fluoride (PVDF), polyacrylonitrile, and polymethylmethacrylate, and the water-based binder may be styrene-butadiene rubber (SBR), but are not necessarily limited thereto.

The conductive material may improve the electrical conductivity of lithium secondary batteries. The conductive material may include a metal-based material. In accordance with one embodiment, the conductive material may include a conventional carbon-based conductive material. For example, the conductive material may include one of graphite, carbon black, graphene, and carbon nanotubes. The conductive material may include carbon nanotubes.

In addition, the electrode assembly for a secondary battery may further include a cathode tab extending from the cathode plate and an anode tab extending from the anode plate. In one embodiment, the cathode tab and anode tab may protrude in a direction perpendicular to a direction that the separator comes in contact with each of the cathode plate and anode plate, that is, in a longitudinal direction. The cathode tab and anode tab may protrude in the same direction along a longitudinal direction or in an opposite direction along a longitudinal direction.

The separator may be disposed between the cathode plate and anode plate. The separator is configured to prevent electrical short circuits between the cathode plate and anode plate and generate a flow of ions.

In accordance with an embodiment, the separator may include a porous polymer film or a porous nonwoven fabric. Here, the porous polymer film may be formed in a single layer or multiple layers including polyolefin-based polymers such as ethylene polymers, propylene polymers, ethylene/butene copolymers, ethylene/hexene copolymers, and ethylene/methacrylate copolymers. The porous nonwoven fabric may include glass fibers with a high melting point and polyethylene terephthalate fibers. However, it is not limited thereto, and the separator may be a ceramic-containing high heat resistant separator (CCS; Ceramic Coated Separator) in accordance with another embodiment.

In the accommodating portion inside the cartridge type secondary battery module 1000, an electrolyte that is provided with the secondary battery cells 200 may be included. The electrolyte may be a non-aqueous electrolyte. The electrolyte may include lithium salts and organic solvents. In accordance with one embodiment, the organic solvent may include one of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, and tetrahydrofuran.

In one embodiment, the secondary battery cell 200 may be a pouched type secondary battery or a can type secondary battery with a prismatic or circular shape. In the case of the pouched type secondary battery, the pouched type secondary battery may have a three-sided sealing structure or the pouched type secondary battery may have a four-sided sealing structure, but the present disclosure it is not limited to these specific types of secondary batteries.

For example, the secondary battery cell 200 may be configured in the pouched type secondary battery and have a structure in which an electrode lead protrudes to the outside. The secondary battery cell 200 may be configured in a form in which the electrode assembly is accommodated in a pouch. The electrode assembly may have a plurality of electrode plates and electrode tabs and may be accommodated in the pouch. Here, in one embodiment, the electrode plate may include the cathode plate and the anode plate, and the electrode assembly may be configured in a form in which the cathode plate and the anode plate are stacked with the separator interposed therebetween while surfaces of the cathode plate and the anode plate face each other. The cathode plate and the anode plate may be formed as a structure in which an active material slurry is applied to the current collector. The slurry may conventionally be formed by stirring a granular active material, auxiliary conductor, binder, and plasticizer, with a solvent added. In addition, in the electrode assembly, a plurality of cathode plates and a plurality of anode plates may be stacked in the left and right directions (or in the horizontal direction). In this example, electrode tabs may be provided in the plurality of cathode plates and the plurality of anode plates, respectively, and connected to the same electrode lead by coming in contact with each other with the same polarity. For the secondary battery cell 200, in one embodiment, the two electrode leads may be disposed to face opposite directions from each other or disposed to face the same direction but at different heights.

In one embodiment, the pouch may be formed in the form of a container to provide an internal space in which the electrode assembly and the electrolyte are accommodated. The electrode leads of the electrode assembly may be partially exposed to the outside of the pouch.

The pouch may be divided into an accommodating space and a sealing portion. The accommodating space may be formed in the form of a container to provide a square-shaped internal space. Inside the accommodating space, the electrode assembly and the electrolyte may be accommodated. The sealing portion may be a part which seals the circumference of the accommodating space as a part of the pouch is bonded. Therefore, the sealing portion may be formed in the form of a flange that extends to the outside from the accommodating space formed in the form of a container, and the sealing portion may be disposed along the outer edge of the accommodating space. A heat fusion method may be used for the bonding of the pouch for forming the sealing portion, but the present disclosure is not limited thereto.

In addition, in one embodiment, the sealing portion may be divided into a first sealing portion in which the electrode lead is disposed and a second sealing portion in which the electrode lead is not disposed.

In one embodiment, the pouch may be prepared by forming a sheet of exterior material. More specifically, after preparing one or two storages on a sheet of exterior material, the pouch may be completed by folding the exterior material so that the storages may form a space, that is, an accommodating space.

In one embodiment, the accommodating space may be formed into a rectangular shape. In addition, the outer edge of the accommodating space may be provided with the sealing portion that is formed by bonding the exterior material. However, there may be no need to form the sealing portion on a surface where the exterior material is folded. Therefore, in one embodiment, the sealing portion may be formed on the outer edge of the accommodating space, but provided only on three of the four surfaces of the accommodating space, and the sealing portion may not be disposed on any one of the outer edges of the accommodating space.

In one embodiment, since the electrode leads can be disposed to face opposite directions to each other, the two electrode leads may be disposed in the sealing portion formed on each different side, whereby the sealing portion may have two first sealing portions in which the electrode leads are disposed and one second sealing portion in which the electrode leads are not disposed. The second sealing portion may be formed on an upper or lower surface of the pouch.

In another embodiment, the accommodating space is formed by overlapping two sheets of exterior material and forming the sealing portions on all four surfaces of the circumference of the accommodating space.

The blocking member 130 may be disposed between the different secondary battery cells 200 accommodated in the accommodating portion. The blocking member 130 may be configured to block the transfer of high-temperature heat generated in any secondary battery cell to other secondary battery cells.

Figure 3:
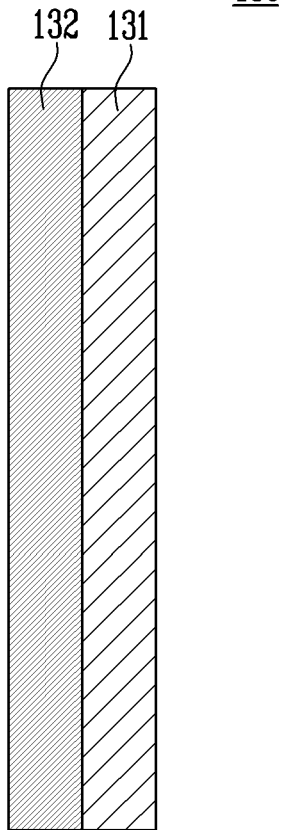
FIG. 3 is a diagram for illustrating still another embodiment of a blocking member included in a cartridge type secondary battery module.

FIG. 3 is a diagram for illustrating another embodiment of the blocking member 130 included in the cartridge type secondary battery module in accordance with one embodiment of the present disclosure.

Referring to FIG. 3, the blocking member 130 may include an insulation layer 131 and a shock absorption layer 132. The insulation layer 131 may include insulation materials capable of blocking heat. For example, a sheet molding compound (SMC), an insulation tape, and a metal substrate combined with an insulation material may be used as the insulation layer 131. The insulation tape may include an insulation material such as mica or silica.

For the insulation material, inorganic fibers such as glass fiber, rock wool, ceramic wool, gypsum fiber, carbon fiber, stainless steel fiber, slag fiber, alumina fiber, silica fiber, silica alumina fiber, and zirconia fiber may be used, and a sheet-like substrate formed of such inorganic fibers may be used as the insulation layer 131. Alternatively, the inorganic fiber may be used as the insulation layer 131 by being laminated onto a metal foil. Alternatively, an insulation sheet such as an aerogel sheet may be used as the insulation layer 131.

In addition, the insulation layer 131 may further include a flame retardant. For example, the flame retardant may be for example at least one type of flame retardants selected from the group consisting of bromine-based flame retardant, chlorine-based flame retardant, phosphorus-based flame retardant, boron-based flame retardant, silicon-based flame retardant, and nitrogen-containing compound. The flame retardant may be used alone or in combination with two or more of the above-noted materials.

The insulation layer 131 may further include a binder for forming inorganic powder into a sheet shape. The binder may be one or more types selected from the group consisting of thermosetting resins, thermoplastic resins, thermoplastic elastomers, and rubber.

Here, the thermoplastic resin may be, for example, polyolefin resins such as polypropylene resin, polyethylene resin, poly(1-)butene resin, and polypentene resin, polyester resin such as polyethylene terephthalate, polystyrene resin, acrylonitrile-butadiene-styrene (ABS) resin, ethylene vinyl acetate copolymer (EVA), polycarbonate resin, polyphenylene ether resin, (meta)acrylic resin, polyamide resin, polyvinyl chloride resin (PVC), novolac resin, polyurethane resin, and polyisobutylene.

In addition, the thermosetting resin may be, for example, synthetic resins such as polyurethane, polyisocyanate, phenolic resin, epoxy resin, urea resin, melamine resin, unsaturated polyester resin, and polyimide.

In addition, thermoplastic elastomers may be, for example, olefin-based elastomers, styrene-based elastomers, ester-based elastomers, amide-based elastomers, vinyl chloride-based elastomers, or combinations thereof.

In addition, the rubber may be, for example, rubbery materials such as natural rubber, isoprene rubber, butadiene rubber, 1,2-polybutadiene rubber, styrene-butadiene rubber, chloroprene rubber, nitrile rubber, butyl rubber, chlorinated butyl rubber, ethylene-propylene rubber, ethylene-propylene-diene rubber (EPDM), chlorosulfonated polyethylene, acrylic rubber, epichlorohydrin rubber, polysulfide rubber, unvulcanized rubber, silicone rubber, fluorine rubber, and urethane rubber.

As the binder, any of the above-described synthetic resins and rubber may be used alone, and two or more types of the synthetic resins may be mixed.

The shock absorption layer 132 may include a material that is elastically compressed by expansion of the secondary battery cell. For example, the shock absorption layer 132 may include one or more types of materials selected from the group consisting of polyurethane-based materials, silicone-based materials, polyether-based materials, polyester-based materials, acrylic materials, rubber-based materials, and EVA-based materials. Accordingly, the shock absorption layer 132 may be configured to absorb a volume change due to a swelling phenomenon of the secondary battery cell 200. That is, by absorbing the volume change due to the swelling phenomenon of the shock absorption layer 132, the pressure applied to the inside of the battery module due to swelling may be alleviated to ensure stability in a module structure.

Excessive pressure applied to the secondary battery cell may be avoided, such that damage of the secondary battery cell may be prevented, and furthermore, the service life of the secondary battery cell may be increased as the generation of irregular pressure is mitigated.

Figure 4:
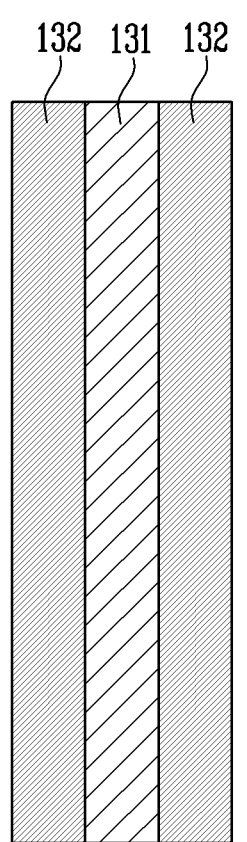
FIG. 4 is a diagram for illustrating yet another embodiment of a blocking member included in a cartridge type secondary battery module.

FIG. 4 is a diagram for illustrating another embodiment of the blocking member included in the cartridge type secondary battery module in accordance with one embodiment of the present disclosure.

Referring to FIG. 4, the blocking member 130 may include two shock absorption layers 132 disposed apart from each other and the insulation layer 131 disposed between the shock absorption layers 132.

The blocking member 130 in FIG. 4 may be configured to perform a thermal blocking function and a volume change absorption function due to the swelling phenomenon by combining the shock absorption layer 132 and the insulation layer 131. In addition, by appropriately adjusting a thickness of the shock absorption layer 132 and the insulation layer 131 of the blocking member 130, it is possible to secure a space that may further accommodate the secondary battery cell. Furthermore, an assembly process may be simplified by using the blocking member 130 coupled together in a structure as shown in FIG. 4 in advance.

In the blocking member 130 having the structure as shown in FIG. 4, since the shock absorption layer 132 (whose surface is relatively easy to manage) is disposed on an outer edge, it is possible to manage the blocking member 130. In addition, the blocking member 130 having the structure as shown in FIG. 4 may be more effective in absorbing volume changes by the swelling phenomenon of the secondary battery cell 200.

Figure 5:
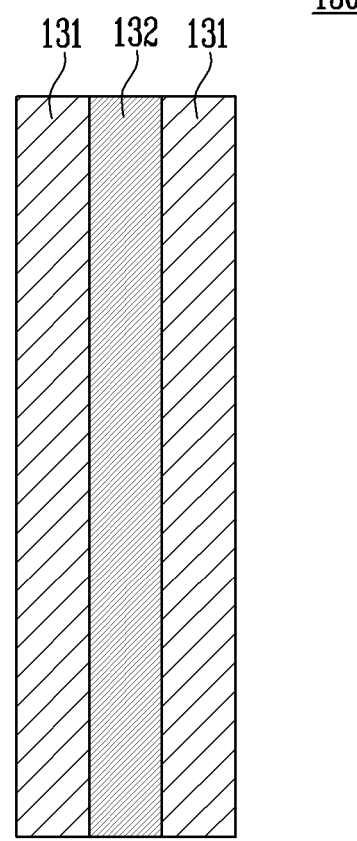
FIG. 5 is a diagram for illustrating another embodiment of a blocking member included in a cartridge type secondary battery module.

FIG. 5 is a diagram for illustrating another embodiment of the blocking member included in the cartridge type secondary battery module in accordance with one embodiment of the present disclosure.

Referring to FIG. 5, the blocking member 130 may include two insulation layers 131 disposed apart from each other and the shock absorption layer 132 disposed between the insulation layers 131.

The blocking member 130 in FIG. 5 may be configured to perform a thermal blocking function and a volume change absorption function for the swelling phenomenon of the secondary battery cell 200 by combining the shock absorption layer 132 and the insulation layer 131. In addition, by appropriately adjusting a thickness of the shock absorption layer 132 and the insulation layer 131 of the blocking member 130, it is possible to secure a space that may further accommodate the secondary battery cell. Furthermore, the assembly process may be simplified by using the blocking member 130 coupled together in a structure as shown in FIG. 5 in advance.

The blocking member 130 having the structure as shown in FIG. 5 may be configured to prevent deterioration in the volume change absorption function due to the swelling phenomenon of the secondary battery cell 200 as the insulation layer 131 prevents the shock absorption layer 132 from being deformed or damaged by heat.

In addition, in the case of the insulation layer 131, its thickness can be controlled in the assembly process, and thus, by forming the blocking member 130 in a structure as shown in FIG. 5, it is possible to reduce the overall volume of the blocking member 130. In particular, the thermal insulation performance of the thin insulation layer 131 alone may be insufficient, but the blocking member 130 having the structure as shown in FIG. 5, in which the shock absorption layer 132 is disposed between the two insulation layers 131, may function as a thick insulation material as a whole. Accordingly, in one embodiment, sufficient insulation performance can be obtained while minimizing the thickness of the insulation layer 131, thereby increasing energy density of a battery module by reducing the thickness of the overall blocking member 130.

In addition, for the insulation layer 131 disposed on the outside in the blocking member 130 having the structure as shown in FIG. 5, a flexible material may be used to avoid damage of the secondary battery cell while protecting the shock absorption layer 132.

In FIGS. 3 to 5, embodiments are shown in which the blocking member 130 includes two or fewer insulation layers 131 and shock absorption layers 132, respectively, but the present disclosure is not limited thereto, and the blocking member 130 may include two or more insulation layers 131 and shock absorption layers 132, respectively.

In accordance with another aspect of the present disclosure, a cartridge module can be provided including a plurality of secondary battery modules each including a plurality of secondary battery cells and a cartridge configured to accommodate the plurality of secondary battery cells. The cartridge may include an accommodating portion in which the plurality of secondary battery cells are accommodated, the cartridge may include at least one open surface. The cartridge module may include a cooling plate coming in contact with at least one of the secondary battery cells, and a blocking member coming in contact with at least one of the secondary battery cells.

Figure 6:
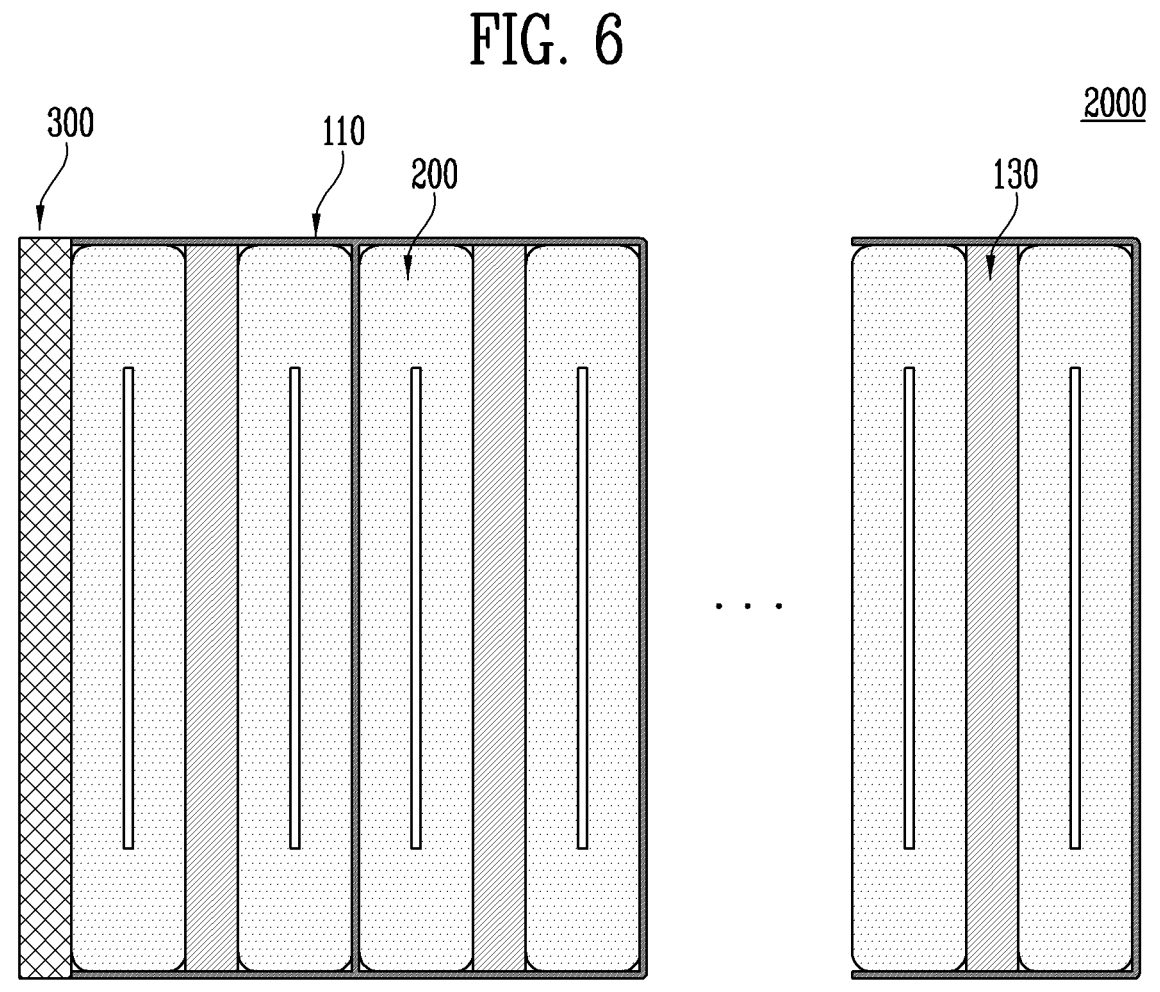

FIG. 6 is a diagram for illustrating the cartridge module in accordance with one embodiment of the present disclosure.

Referring to FIGS. 2 and 6, a cartridge module 2000 in FIG. 6 may be formed from a plurality of cartridge type secondary battery modules (like the secondary battery module 1000 of FIG. 2) stacked together.

In one embodiment, a plurality of cartridge type secondary battery modules 1000 of FIG. 2 may be stacked in a direction of the open surface of the secondary battery module 1000 to form the cartridge module 2000 of FIG. 6. Accordingly, one secondary battery cell 200 labeled in FIG. 6 disposed toward the open surface of an accommodating portion in cartridge module 2000 may come in contact with the cooling plate 110' of another secondary battery module 1000 of cartridge module 2000.

In addition, the cartridge module 2000 may include a bolt which penetrates in the direction in which the plurality of cartridge type secondary battery modules 1000 are stacked. A bolt (may pass through the coupling portions provided in each of the cartridge type secondary battery modules 1000. The plurality of cartridge type secondary battery modules 1000 may be connected to each other by the bolt.

The cartridge module 2000 may further include an end plate 300 at an end in the direction in which the plurality of cartridge type secondary battery modules 1000 are stacked.

Figure 7:
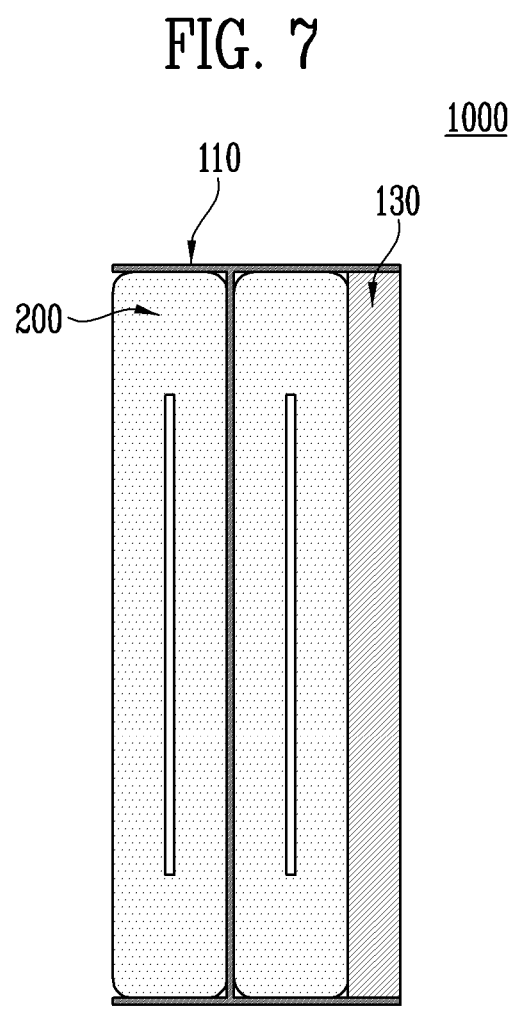

FIG. 7 is a cross-sectional view for illustrating the cartridge type secondary battery module in accordance with another embodiment of the present disclosure.

Referring to FIG. 7, the cooling plate 110 may have a 'I' shape unlike 'C' shape as shown in FIG. 2, and the accommodating portion may be divided into two accommodating spaces by the shape of the cooling plate 110. Any one of the two accommodating spaces may be closed by the cooling plate 110 and the blocking member 130, and another accommodating space may have a surface that is opened (for example in FIG. 7 the surface to the left of the labelled battery cell 200). Accordingly, the secondary battery cell 200 accommodated in any one accommodating space may be surrounded by the cooling plate 110 and the blocking member 130, and one surface of the secondary battery cell 200 accommodated in another accommodating space may be placed in a direction of the open surface of the accommodating portion.

Figure 8:
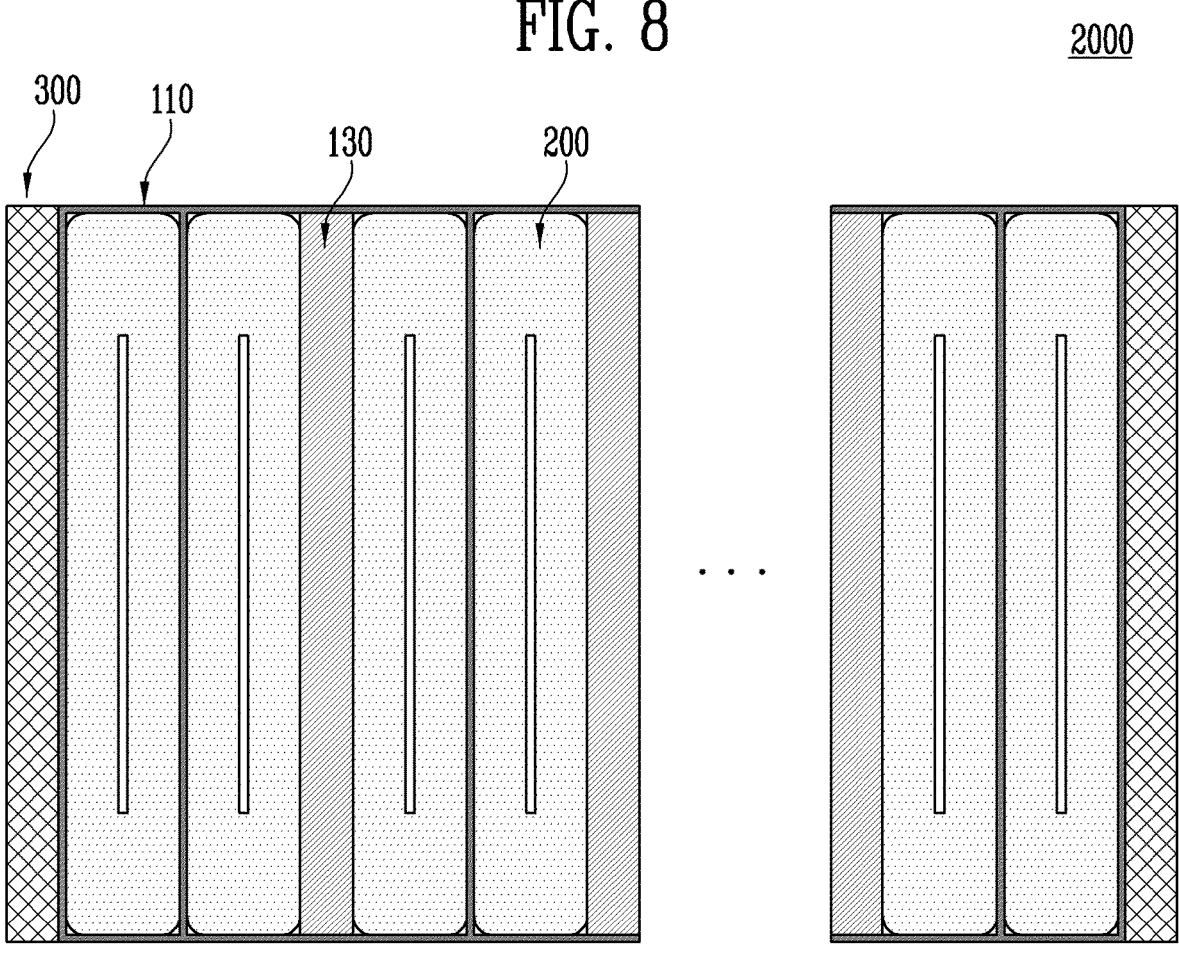
FIG. 8 is a diagram for illustrating a cartridge module in accordance with yet another embodiment of the present disclosure.

FIG. 8 is a diagram for illustrating the cartridge module in accordance with another embodiment of the present disclosure.

Referring to FIGS. 7 and 8, the cartridge module 2000 in FIG. 8 may be formed from a plurality of cartridge type secondary battery modules (like the 'I' shaped secondary battery module 1000 of FIG. 7) stacked together.

In one embodiment, a plurality of cartridge type secondary battery modules 1000 of FIG. 7 may be stacked in a direction of the open surface of the secondary battery module 1000 to form the cartridge module 2000 of FIG. 8. Therefore, the secondary battery cell 200 may be adjacent to the open surface of the accommodating portion in any one secondary battery module 1000 may come in contact with the blocking member 130 of another secondary battery module 1000.

In addition, the cartridge module 2000 may include a bolt penetrating in the direction in which the plurality of cartridge type secondary battery modules 1000 are stacked. The bolt may pass through the coupling portions provided in each of the cartridge type secondary battery modules 1000. The plurality of cartridge type secondary battery modules 1000 may be connected to each other by the bolt.

The cartridge module 2000 may further include the end plate 300 at an end in the direction in which the plurality of cartridge type secondary battery modules 1000 are stacked. At least one selected from the group consisting of a cooling plate and a blocking member may be positioned between the end plate and the battery module.

In accordance with another aspect of the present disclosure, it is possible to provide a battery pack including a pack case; and a plurality of cartridge modules embedded in the pack case, wherein each of the cartridge modules includes a plurality of secondary battery modules each including a plurality of secondary battery cells and a cartridge configured to accommodate the plurality of secondary battery cells, wherein the cartridge may include an accommodating portion in which the plurality of secondary battery cells are accommodated and which includes at least one open surface; a cooling plate coming in contact with at least one of the secondary battery cells; and a blocking member coming in contact with at least one of the secondary battery cells.

The pack case may be configured to accommodate a plurality of cartridge modules 2000.

The secondary battery modules 1000 included in each of the plurality of cartridge modules 2000 may be stacked with each other in a direction of the open surface.

While the present disclosure has been shown and described with reference to the disclosed embodiments thereof, it will be understood that various changes in form and details may be made therein without departing from the scope of the present disclosure and their equivalents.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, those skilled in the art will recognize that various modifications to the embodiments disclosed are within the technological scope of the present disclosure.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. Those skilled in the art will recognize that various modifications to the embodiments disclosed are within the technological scope of the present disclosure in addition to the embodiments disclosed herein. Furthermore, the embodiments may be combined to form additional embodiments.

What is claimed is:

1. A cartridge type secondary battery module, comprising:
a plurality of secondary battery cells; and
a cartridge comprising an accommodating portion in which the plurality of secondary battery cells are accommodated, a cooling plate in contact with at least one of the secondary battery cells, and a blocking member in contact with at least one of the secondary battery cells,
wherein the accommodating portion comprises at least one open surface,
wherein the cooling plate has an approximately C-shape and the accommodating portion is formed by the C-shape of the cooling plate, and
wherein at least two of the plurality of secondary battery cells are accommodated by the accommodating portion.

2. The cartridge type secondary battery module of claim 1, wherein the blocking member comprises:
one or more insulation layers configured to block heat; and
one or more shock absorption layers that are elastically compressed by swelling of the secondary battery cell upon heating.

3. The cartridge type secondary battery module of claim 2, wherein the insulation layer comprises an insulation material.

4. The cartridge type secondary battery module of claim 2, wherein the shock absorption layer comprises one or more materials selected from the group consisting of polyurethane-based materials, silicone-based materials, polyether-based materials, polyester-based materials, acrylic materials, rubber-based materials, and ethylene vinyl acetate (EVA)-based materials.

5. The cartridge type secondary battery module of claim 1, wherein the blocking member is interposed between different secondary battery cells.

6. The cartridge type secondary battery module of claim 1, wherein the accommodating portion is divided into a first accommodating space and a second accommodating space by the cooling plate.

7. The cartridge type secondary battery module of claim 6, wherein the blocking member is disposed at an end of the first accommodating space opposite to the cooling plate.

8. The cartridge type secondary battery module of claim 7, wherein, in the second accommodating space, the at least one open surface is opposite to the cooling plate.

9. A cartridge module, comprising:
a plurality of secondary battery modules each comprising a plurality of secondary battery cells and a cartridge configured to accommodate the plurality of secondary battery cells, wherein the cartridge comprises:

an accommodating portion in which the plurality of secondary battery cells are accommodated and which comprises at least one open surface;

a cooling plate in contact with at least one of the secondary battery cells; and a blocking member in contact with at least one of the secondary battery cells, wherein the cooling plate has an approximately C-shape and the accommodating portion is formed by the C-shape of the cooling plate, and wherein at least two of the plurality of secondary battery cells are accommodated by the accommodating portion.

10. The cartridge module of claim 9, wherein the plurality of secondary battery modules are stacked in a direction of the at least one open surface.

11. The cartridge module of claim 10, further comprising a bolt penetrating the secondary battery modules in a stack direction of the secondary battery modules.

12. A battery pack, comprising:

a pack case; and a plurality of cartridge modules embedded in the pack case, wherein each of the cartridge modules comprises a plurality of secondary battery modules each comprising a plurality of secondary battery cells and a cartridge configured to accommodate the plurality of secondary battery cells, and wherein the cartridge comprises:

an accommodating portion in which the plurality of secondary battery cells are accommodated and which comprises at least one open surface;

a cooling plate in contact with at least one of the secondary battery cells; and a blocking member in contact with at least one of the secondary battery cells, wherein the cooling plate has an approximately C-shape and the accommodating portion is formed by the C-shape of the cooling plate, and wherein at least two of the plurality of secondary battery cells are accommodated by the accommodating portion.

13. The battery pack of claim 12, wherein the secondary battery modules included in each of the cartridge modules are stacked in a direction of the at least one open surface.

* * * * *